US007378827B2

(12) United States Patent
Stoichita

(10) Patent No.: US 7,378,827 B2
(45) Date of Patent: May 27, 2008

(54) ANALOG INTERNAL SOFT-START AND CLAMP CIRCUIT FOR SWITCHING REGULATOR

(75) Inventor: Ioan Stoichita, Campbell, CA (US)

(73) Assignee: Micrel, Incorporated, San Jose, CA (US)

( * ) Notice: Subject to any disclaimer, the term of this patent is extended or adjusted under 35 U.S.C. 154(b) by 388 days.

(21) Appl. No.: 11/211,199

(22) Filed: Aug. 24, 2005

(65) Prior Publication Data

US 2007/0052403 A1 Mar. 8, 2007

(51) Int. Cl.
*G05F 1/40* (2006.01)

(52) U.S. Cl. ...................................... 323/285; 323/288

(58) Field of Classification Search ................ 323/282, 323/284, 285, 315, 901, 908, 288, 290; 363/49
See application file for complete search history.

(56) References Cited

U.S. PATENT DOCUMENTS 4,806,842 A 2/1989 Bittner
6,038,155 A * 3/2000 Pelly ........................... 363/49
6,204,649 B1 3/2001 Roman
6,316,926 B1 11/2001 Savo et al.
RE37,609 E 3/2002 Bittner
6,515,880 B1 2/2003 Evans et al.
6,674,272 B2 1/2004 Hwang
6,841,977 B2 1/2005 Huang et al.

OTHER PUBLICATIONS

Publication entitled: "High Power Step-Down Synchronous DC/DC Controllers For Low Voltage Operation", LTC3830/LTC3830-1, Linear Technology Corporation, 2001, pp. 1-24.
Publication entitled: "Micropower Constant Frequency Step-Down DC/DC Controllers in ThinSOT", LTC3801/LTC3801B, Linear Technology Corporation, 2003, pp. 1-12.
Publication entitled: "Buck And Synchronous-Rectifier (PWM) Controller And Output Voltage Monitor", HIP6004, Intersil Data Sheet, Mar. 2000, File No. 4275.2, pp. 1-12.

(Continued)

*Primary Examiner*—Jessica Han
(74) *Attorney, Agent, or Firm*—Bever, Hoffmann & Harms, LLP; Patrick T. Bever

(57) ABSTRACT

An analog soft-start circuit for a switching regulator (e.g., a buck converter) including an analog ramp circuit and an open-loop analog voltage clamp circuit. The voltage ramp circuit utilizes a two-stage current divider circuit to generate a very low, stable current signal, and an integrator circuit including a relatively small, integral capacitor to generate the ramp voltage signal in response to the very low current signal. The analog voltage clamp circuit clamps the regulated output signal to the ramp voltage until the ramp voltage signal increases to a predetermined voltage level, thereby causing the regulated output voltage to exhibit the desired soft-start characteristics. The analog clamp circuit includes a current mirror circuit that generates a clamp current that pulls down the error amplifier output stage via a clamping element (e.g., a diode) until the ramp voltage signal reaches a predetermined level.

17 Claims, 3 Drawing Sheets

OTHER PUBLICATIONS

Publication entitled: "A Voltage Regulator Module (VRM) Using The HIP6004 PWM Controller (HIP6004EVAL1)", Intersil Application Note, Jan. 1997, AN9672, pp. 4-1-4-7.

Publication entitled: "Dual Mode PWM/Linear Buck Converter", NCP1501/D, ON Semiconductor, Mar 2004, Rev. 7, Semiconductor Components Industries, LLC, 2004, pp. 1-14.

Publication entitled: "Low Voltage Synchronous Buck Controller", NCP1580/D, ON Semiconductor, Jan. 2005, Rev. 4, Semiconductor Components Industries, LLC, 2005, pp. 1-12.

Publication entitled: "Simple Synchronous Buck Converter Design-MCP1612", Microchip AN968, 2005 Microchip Technology Inc., pp. 1-6.

* cited by examiner

ANALOG INTERNAL SOFT-START AND CLAMP CIRCUIT FOR SWITCHING REGULATOR

FIELD OF THE INVENTION

The invention relates generally to switching regulators and, more particularly, to the startup operation of buck converters.

BACKGROUND OF THE INVENTION

Switching-type regulators typically include a high current switch (e.g., a MOSFET) along with an oscillator and pulse width modulator (PWM) that can operate the switch and vary its duty cycle as a function of a feedback or control voltage input. When combined with appropriate external components, such regulators can provide a regulated direct current (DC) voltage output signal. Buck converters are switching-type voltage regulators in which the output voltage is substantially lower ("stepped down") than an applied input voltage. In contrast, up-converters are switching-type voltage regulators in which the regulated output exceeds the input supply voltage, and positive-to-negative or negative-to-positive polarity converters are switching-type voltage regulators in which the regulated output is inverted. In terms of power supply efficiency switching-type regulators can operate at about 90% or better.

FIG. 3 is a diagram showing a simplified circuit including a conventional buck converter 10. Buck converter 10 includes an error amplifier 50 that receives a reference voltage $V_{REF}$ on its non-inverting input and a feedback signal $V_{FB}$ on its inverting signal. The output signal $V_{EA\text{-}OUT}$ from error amplifier 50 is applied to one input terminal of a pulse width modulator (PWM) circuit 70, and a second input terminal of PWM circuit 70 is connected to receive an oscillating ramp signal $V_{OSC\text{-}RAMP}$ from an oscillator 80. The PWM circuit 70 compares error amplifier output signal $V_{EA\text{-}OUT}$ with oscillating ramp signal $V_{OSC\text{-}RAMP}$ to produce a square wave signal $V_{PULSE}$ having a duty cycle whose instantaneous value is related to the voltage level of error amplifier output signal $V_{EA\text{-}OUT}$. Square wave signal $V_{PULSE}$ is applied to the gate of a power transistor 75, which generates a regulated output voltage $V_{OUT}$ that is applied to a load represented by inductor $L_L$, a capacitor $C_L$, and a resistor $R_L$. By feeding back a portion of regulated output voltage $V_{OUT}$ via a suitable feedback circuit (e.g., the divider formed by resistors $R_1$ and $R_2$), the duty cycle of PWM circuit 70 can be maintained at a level that generates the duty cycle needed to produce the desired regulated voltage $V_{OUT}$.

A problem associated with conventional buck converters is voltage overshoot at start up. Before start up, load capacitance $C_L$ is fully discharged, and output voltage $V_{OUT}$ is zero. At start up (e.g., when power $V_{DD}$ is applied), feedback voltage $V_{FB}$ is initially zero, so reference voltage $V_{REF}$ will dominate the operation of error amplifier 50, thus causing it to generate output signal $V_{EA\text{-}OUT}$ that maximizes the duty cycle of PWM circuit 70 in an effort to charge load capacitor $C_L$ as rapidly as possible. The resulting surge can damage output transistor 75 and typically overshoots the desired output voltage, possibly overloading the input supply and/or damaging the load circuit. The surge would also generate a huge input current, touching the alarm limit on the input supply. Accordingly, some form of "soft-start" is desirable where the starting surge is avoided.

One prior art solution to the start up overshoot problem is to employ some form of "soft-start", where the starting surge is avoided by causing output voltage $V_{OUT}$ to gradually rise from zero to the desired nominal level at start up. A common method for achieving this soft-start function is to employ an external capacitor to control the error amplifier output signal $V_{EA\text{-}OUT}$ such that it increases gradually at start up, thereby causing the duty cycle of PWM 70 to gradually increase, thus preventing significant overshoot when the desired output voltage is $V_{OUT}$ achieved. External capacitors are used to produce the soft-start function because operational amplifier currents are typically too large to support the use of practical semiconductor (i.e., integrated) capacitors. The size (capacitance) of the external capacitor is selected to achieve desired output characteristics (i.e., based on the load circuit impedance and desired overshoot characteristics), and the external capacitor is typically connected to the operational amplifier during assembly by way of a dedicated device pin.

A problem with the practice of using external capacitors to produce desired soft-start characteristics is that the use of external capacitors is relatively expensive due to both the component cost and the assembly costs associated with mounting the external capacitor. Further, the external capacitor takes up a valuable device pin, which prevents the use of that pin for other input/output signals.

One prior art solution to the start up overshoot problem is to employ a digital soft-start circuit, which digitally controls the duty cycle of the regulator during start up, thereby providing the soft-start function without the need for a large external capacitor. A problem with digital soft-start circuits is that they require a significantly larger amount of chip area than analog solutions, so by comparison analog soft-start solutions present a strong price and simplicity advantage.

What is needed is an analog soft-start circuit for switching regulator that generates a ramp voltage without using an external capacitor and dedicated device pin. What is also needed is an analog soft-start circuit for switching regulator that uses an analog voltage clamp circuit to ramp the regulated output voltage to the desired voltage level without significant overshoot.

SUMMARY OF THE INVENTION

The present invention is directed to an analog soft-start circuit for an improved switching regulator that generates a ramp voltage at start up without using an external capacitor and dedicated device pin by utilizing a current divider circuit to generate a very low current signal, and an integrator circuit including a relatively small, integral capacitor that is charged by the very low current signal to generate the ramp voltage signal. The voltage divider provides the very low current signal in a manner that is insensitive to supply voltage noise, thus causing the integral capacitor to provide the ramp voltage in a manner that is insensitive to supply voltage noise. The analog soft-start circuit also includes an open-loop analog voltage clamp circuit that clamps the regulated output signal to the ramp voltage until the ramp voltage signal increases to a predetermined voltage level, thereby producing the desired soft-start at the switching regulator output terminal, and preventing significant overshoot of the regulated output voltage.

In accordance with an embodiment of the present invention, a buck converter utilizes an analog soft-start circuit to supply a regulated output voltage to a load circuit. Similar to conventional buck converters, the buck converter of the present invention utilizes an error amplifier circuit, an output control circuit, and a power transistor to generate the regulated output voltage. The error amplifier includes a comparator having an inverting input terminal receiving a feedback portion of the regulated output voltage, non-inverting input terminal receiving a predetermined reference voltage, and generates an amplifier control (output) signal in response to these two signals. The error amplifier also includes an output stage including an output transistor that is controlled by the amplifier control signal. The output control circuit includes, for example, a pulse width modulator (PWM) circuit for generating a pulse output signal in response to the amplifier output signal and an oscillating ramp (sawtooth) signal generated by an internal oscillator circuit. The pulse output signal is applied to the gate terminal of the power transistor, which generates the regulated output voltage at a level determined by the predetermined reference voltage.

In accordance with an aspect of the invention, the analog voltage ramp circuit includes a current source for generating a relatively high current, and a two-stage current divider to divide the relatively high current in order to generate a stable, relatively low current.

In accordance with another aspect of the invention, the analog integrator circuit is implemented using a Miller integrator having a relatively small internal (i.e., CMOS fabricated) Miller capacitor that generates a ramp voltage signal in response to the relatively low current. When system power is first applied to the buck converter (or when reset), current is shunted around the Miller capacitor to ground, thus maintaining the ramp voltage signal and capacitor voltage at zero volts. When a soft-start reset control signal is asserted (i.e., when the system voltage is stabilized and a system "enable" control signal is asserted), the switches are turned off (opened), which forces the relatively small current drawn by the analog voltage divider to be drawn through the Miller capacitor, thus causing the ramp voltage signal to begin to increase at a slew rate determined by the Miller capacitance and the relatively low current, thereby facilitating the generation of a reliable ramp voltage without the use of external capacitors and/or dedicated device pins. The final stage of the ramp takes place when the drains of the switches reach the system power level.

In accordance with another aspect of the invention, the analog voltage clamp circuit is an open loop circuit (i.e., having no internal feedback) that effectively clamps the amplifier control signal to the ramp voltage signal, thereby causing the regulated output voltage to exhibit the desired soft-start characteristic. The analog clamp circuit includes a current mirror circuit that generates a clamp current. The current mirror circuit is coupled to the error amplifier output stage via a clamping element (i.e., a diode or transistor), and is also coupled to an NMOS (switch) transistor whose gate is controlled by the ramp voltage signal. While the ramp voltage signal is low (zero volts), the switch transistor remains turned off, causing all of the clamp current to be drawn from the error amplifier output stage through the clamping element, thus pulling down the error amplifier output signal and minimizing the regulated output voltage. At power up (or reset), while the ramp voltage signal increases from zero volts toward the predetermined voltage level, the switch transistor gradually turns on to supply an increasing portion of the clamp current drawn by the current mirror circuit, which in turn gradually reduces the current drawn from the error amplifier output stage through the clamping element, thereby causing the amplifier control signal to gradually increase in response to the ramp voltage signal and causing the buck converter to provide the desired soft-start regulated output voltage. When the ramp voltage signal reaches the predetermined voltage level, the switch transistor is fully turned on to supply the entire clamp current drawn by the current mirror circuit, which in turn cuts off current flow through the clamping element from the error amplifier output stage. Accordingly, the current error amplifier output stage becomes effectively isolated from the analog soft-start circuit, and operates in a conventional manner to produce the regulated output voltage.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention is directed to improved switching regulators, and in particular to switching regulators that utilize analog circuitry to provide a soft-start function. While the present invention is described below with specific reference to buck converters utilizing pulse width modulation, those skilled in the art will recognize that the analog soft-start circuit described herein may be employed in other types of switching regulators, such as boost, flyback converters or buck converters using pulse frequency modulation.

Figure 1:
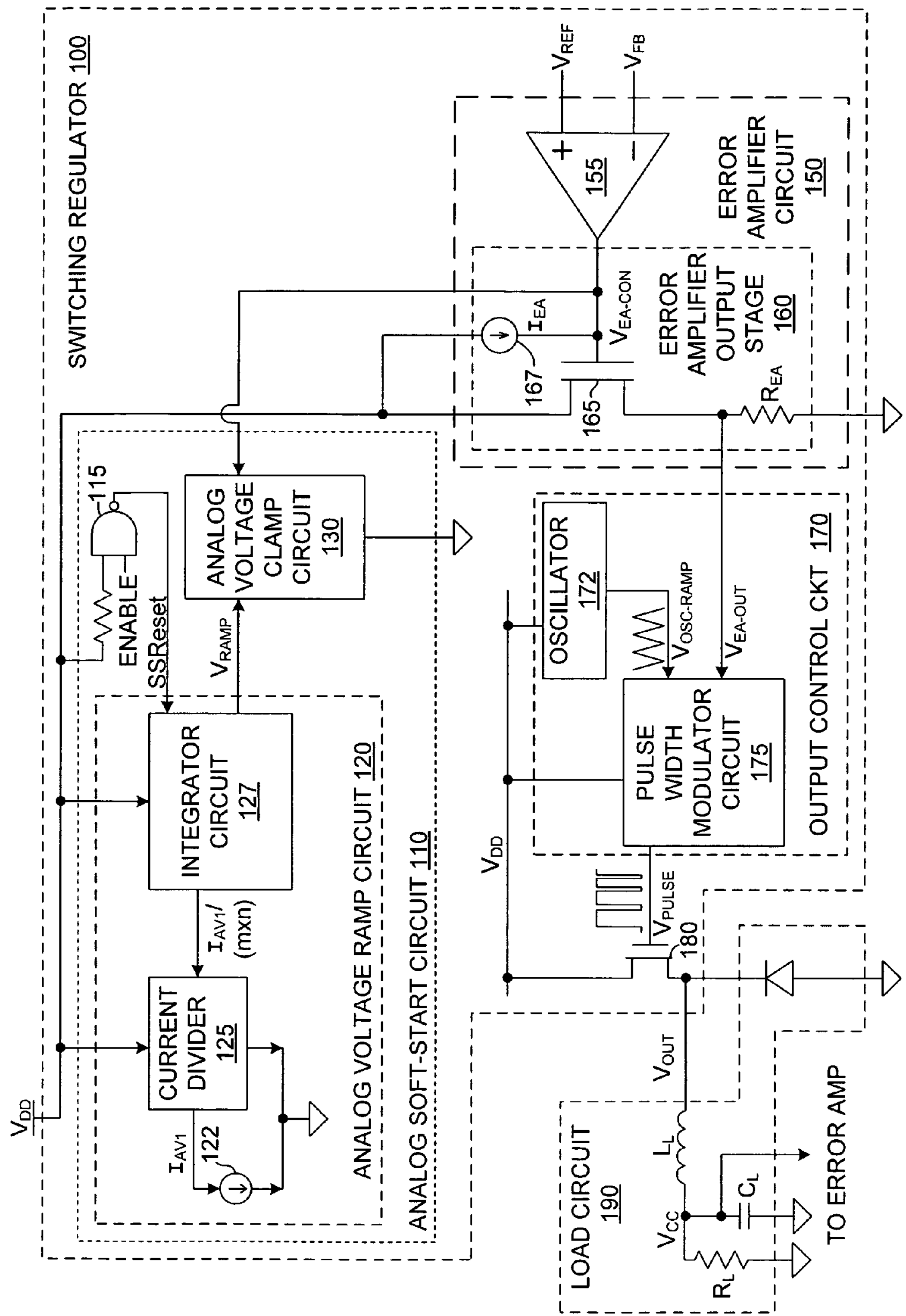
FIG. 1 is a modified block diagram depicting a buck converter for supplying a regulated output voltage to a load circuit in accordance with a simplified embodiment of the present invention.

FIG. 1 is a modified block diagram depicting a buck converter 100 for supplying a regulated output voltage $V_{OUT}$ to a load circuit 190. Similar to conventional buck converters, buck converter 100 includes an error amplifier circuit 150, a output control circuit 170, and a power transistor 180 to generate regulated output voltage $V_{OUT}$. Buck converter differs from conventional buck converters in that it includes an analog soft-start circuit 110, which operates in the manner described below.

Error amplifier 150 generally includes an input differential stage 155 and an output stage 160. The input differential stage 155 includes an inverting input terminal connected to receive a feedback signal $V_{FB}$ (which in one embodiment is a portion of regulated output voltage $V_{OUT}$), and a non-inverting input terminal coupled to a predetermined reference voltage $V_{REF}$. In accordance with known techniques, the input differential stage 155 generates an amplifier control signal $V_{EA\text{-}CON}$ in response to negative feedback signal $V_{FB}$ and reference voltage $V_{REF}$ to control amplifier control signal $V_{EA\text{-}CON}$ such that regulated output voltage $V_{OUT}$ is maintained at a predetermined voltage level. Output stage 160 includes an output transistor 165 connected between voltage $V_{DD}$ and output control circuit 170. A gate terminal of output transistor 165 is connected to the output terminal of comparator 155, to a relatively small current source 167, and also to analog soft-start circuit 110.

Output control circuit 170 controls power transistor 180 in response to amplifier output signal $V_{EA\text{-}OUT}$ such that regulated output signal $V_{OUT}$ is generated at a selected terminal of power transistor 180. Output control circuit 170 generally includes an oscillator circuit 172 and a pulse width modulator (PWM) circuit 175. Oscillator circuit 172 generates an oscillating ramp (sawtooth) signal $V_{OSC-RAMP}$ that changes in a linear fashion between a low voltage level and a high voltage level. PWM circuit 175 has a first input terminal connected to output transistor 165 such that the first input terminal receives amplifier output signal $V_{EA-OUT}$, and a second input terminal connected to receive oscillating ramp signal $V_{OSC-RAMP}$. Using known techniques, PWM circuit 175 generates a pulse output signal $V_{PULSE}$ in response to a comparison between amplifier output signal $V_{EA-OUT}$ and oscillating ramp signal $V_{OSC-RAMP}$ such that a duty cycle of pulse output signal $V_{PULSE}$ increases in response to an increase in amplifier output signal $V_{EA-OUT}$, and decreases in response to an decrease in amplifier output signal $V_{EA-OUT}$.

Power transistor 180 is, for example, an n-channel MOSFET (NMOS) transistor having a first terminal connected to voltage source VDD, a second terminal connected to load circuit 190, and a gate terminal connected to an output terminal of PWM circuit 175. According to known techniques, power transistor 180 is repeatedly turned on and off by pulse output signal $V_{PULSE}$, whereby output voltage $V_{OUT}$ is maintained at the desired level.

In accordance with the present invention, analog soft-start circuit 110 includes an analog voltage ramp circuit 120 for generating a ramp voltage without using an external capacitor and dedicated device pin by utilizing a current source 122 and a current divider circuit 124 to generate a stable low current signal $I_{AV1}$/(m×n), and an integrator circuit 127 including a relatively small, integral capacitor to generate a suitable ramp voltage signal $V_{RAMP}$. Soft-start circuit 110 also includes an analog voltage clamp circuit 130 that clamps amplifier control signal $V_{EA-CON}$ to ramp voltage signal $V_{RAMP}$ until the ramp voltage signal $V_{RAMP}$ increases to a predetermined minimum voltage level, thereby preventing significant overshoot of regulated output voltage $V_{OUT}$ at start up.

Referring to the upper right portion of FIG. 1, a soft-start reset control signal SSReset is generated by internal circuitry that is represented in a simplified form by NAND gate 115. In particular, soft-start reset control signal SSReset remains at a high voltage state while voltage source $V_{DD}$ remains below a predetermined voltage level and/or an ENABLE control signal is not asserted (high). In contrast, once voltage source $V_{DD}$ reaches the predetermined voltage level and the ENABLE control signal is asserted, soft-start reset control signal SSReset switches to a low voltage state. Soft-start reset control signal SSReset is utilized as described below to control the operation of integrator circuit 127 such that ramp voltage signal $V_{RAMP}$ begins to increase from zero volts to its associated maximum value when soft-start reset control signal SSReset switches from high to low.

Figure 2:
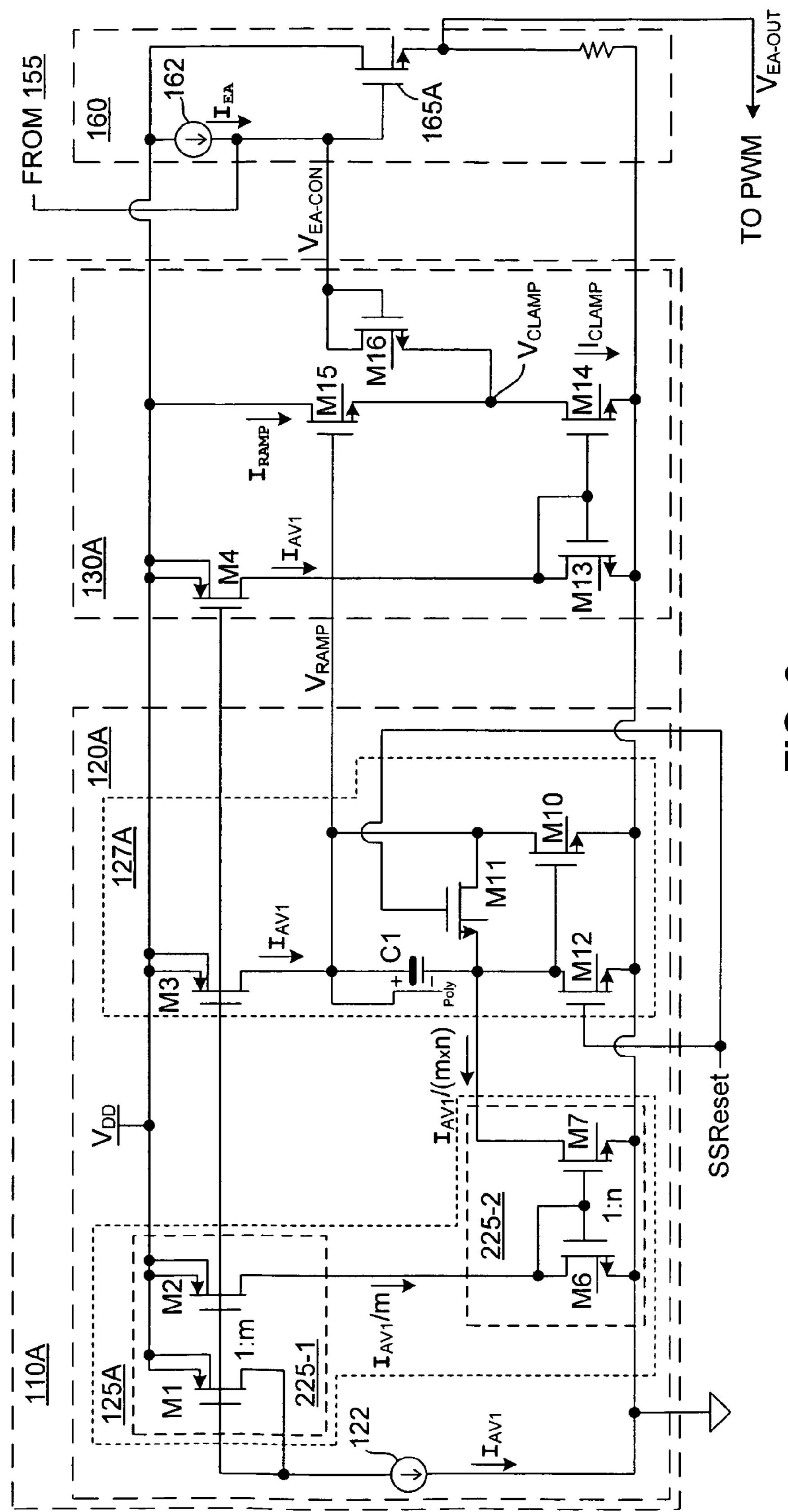
FIG. 2 is a circuit diagram showing an analog soft-start circuit of the buck converter of FIG. 1 in accordance with a specific embodiment of the present invention.
Figure 3:
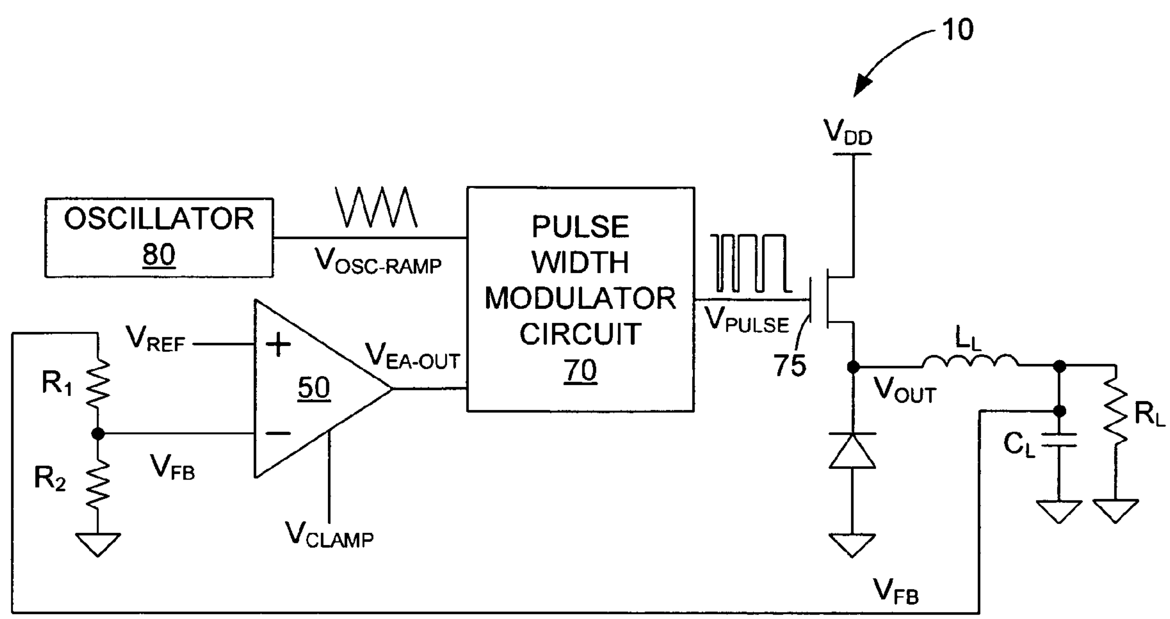
FIG. 3 is a simplified block diagram depicting a conventional switching regulator.

FIG. 2 is a circuit diagram showing an analog soft-start circuit 110A in accordance with a specific embodiment of the present invention. Consistent with generalized analog soft-start circuit 110, analog soft-start circuit 110A includes an analog voltage ramp circuit 120A including a current divider circuit 125A and a Miller integrator circuit 127A.

Referring to the left side of FIG. 2, current divider 125A includes a current source 122 for generating a relatively high (first) current $I_{AV1}$, a first current mirror 225-1 for generating an intermediate current $I_{AV1}$/m in response to current $I_{AV1}$, and a second current mirror 225-2 for generating a relatively low (second) current $I_{AV1}$/(m×n) in response to the intermediate current $I_{AV1}$/m. In particular, first current mirror 225-1 includes a (first) PMOS transistor M1 and a (second) PMOS transistor M2. Transistor M1 is connected in series with current source 122 between voltage source $V_{DD}$ and ground, where a gate terminal of transistor M1 is connected to current source 122 such that relatively high first current $I_{AV1}$ passes through transistor M1. Transistor M2 has a first terminal connected to voltage source $V_{DD}$ and a gate terminal connected to the current source 122, thus creating the same gate voltage in both transistors M1 and M2. However, transistor M2 comprises a smaller PMOS transistor, whose size is selected such that a current $I_{AV1}$/m passing through transistor M2 is m times smaller than current $I_{AV1}$ passing through transistor M1 (in an exemplary embodiment m is equal to ten). Second current mirror 225-2 includes a (third) NMOS transistor M6 and a (fourth) NMOS transistor M7 that are selected to generate relatively low current $I_{AV1}$/(m×n) in response to intermediate current $I_{AV1}$/m. Transistor M6 has a first terminal and a gate terminal connected to the second (lower) terminal of transistor M2, and a second terminal connected to ground, and transistor M7 has a first terminal connected to integrator circuit 127, a gate terminal connected to the second terminal of the second transistor M2, and a second terminal connected to ground. Transistor M7 is smaller than transistor M6 by a factor of n (in an exemplary embodiment n is also equal to ten), whereby current $I_{AV1}$/(m×n) passing through transistor M7 is m×n (e.g., one hundred) times smaller than current $I_{AV1}$ passing through transistor M1. Note that dividing current $I_{AV1}$ in two stages (i.e., current mirror 225-1 and 225-2) generates a substantially more stable low current signal (i.e., having very little noise and/or fluctuation) than a low current generated by other methods (e.g., a single stage divider), and avoids the capture of supply noise. This highly stable low current signal facilitates the use of a small, integral capacitor (i.e., a capacitor fabricated on the same substrate using the same CMOS fabrication technique as that used to form the NMOS and PMOS transistors described herein).

Referring to the center of FIG. 2, integrator circuit 127A is connected to the current divider 125A and is operated such that the relatively low current $I_{AV1}$/(m×n) generated by second current mirror 225-2 passes through integrator circuit 127A, and is used to gradually charge a Miller capacitor C1, whereby the gradually increasing charge on the Miller capacitor provides ramp voltage signal $V_{RAMP}$ that is used to clamp error amplifier output signal $V_{EA-OUT}$. Integrator circuit 127A includes a (fifth) PMOS transistor M3 having a first terminal connected to voltage source $V_{DD}$ and a gate terminal connected to current source 122. Transistor M3 is substantially equal in size to transistor M1 such that substantially the same current $I_{AV1}$ passes through both transistors M1 and M3. Miller capacitor C1 has a first (positive or "+") terminal connected to a second terminal of transistor M3, and a second ("−") terminal connected to ground. A (sixth) transistor M12 has a first terminal connected to the second terminal Miller capacitor C1, and a second terminal connected to ground. A (seventh) transistor M10 has a first terminal connected to the first terminal Miller capacitor C1, a gate terminal connected to the first terminal of transistor M12, and a second terminal connected to ground. A (eighth) transistor M11 is connected between the first terminal of transistor M10 and a first terminal of transistor M7. Respective gate terminals of transistor M12 and transistor M11 are connected to receive reset control signal SSReset, which is described above.

Integrator circuit 127A operates as follows. At start up, but before reset control signal SSReset is switched from high to low, both transistors M11 and M12 are turned on, thereby shunting an current passing through transistor M3 to ground (i.e., through transistor M3 to transistor M11, and from transistor M11 through transistor M12 to ground). During this time, voltage source $V_{DD}$ increases to its nominal value, thereby causing current divider circuit 125A to generate relatively low current $I_{AV1}/(m \times n)$ from analog voltage ramp circuit 127A through transistor M7. When reset control signal SSReset is switched from high to low, transistor M11 and M12 are turned off, which causes relatively low current $I_{AV1}/(m \times n)$ to pass through Miller capacitor C1, thus causing Miller capacitor C1 to begin charging, which in turn causes ramp voltage signal $V_{RAMP}$ to begin increasing from zero volts at a slew rate that is determined by the capacitance of Miller capacitor C1 and relatively low current $I_{AV1}/(m \times n)$. In an exemplary embodiment, Miller capacitor C1 has a capacitance of 8 pF (eight pico-Farads), and current $I_{AV1}/(m \times n)$ is approximately 14 nA (nine nano-Amp), thereby producing ramp voltage signal $V_{RAMP}$ such that is increases at a slew rate of approximately 1.75 mV/us (one point seventy-five millivolts per microsecond). This slew rate is selected to provide the regulated output voltage with the desired soft-start characteristics.

In accordance with another aspect of the invention, analog voltage clamp circuit 160 is an open loop circuit (i.e., having no internal feedback) that pulls down (clamps) amplifier control signal $V_{EA-CON}$ to ramp voltage signal $V_{RAMP}$, thereby causing regulated output voltage $V_{OUT}$ to exhibit the desired soft-start characteristic (i.e., to increase gradually to the desired output level, and to avoid significant overshoot).

Analog clamp circuit 160 includes a current mirror circuit formed by a (ninth) transistor M4, a (tenth) transistor M13, and a (eleventh) transistor M14 that generates a predetermined clamp current $I_{CLAMP}$ that is applied to both a (twelfth) transistor M15 that is controlled by ramp voltage signal $V_{RAMP}$, and a clamping (thirteenth) transistor M16 that acts as a clamping element for passing current from error amplifier output stage 160 when ramp voltage signal $V_{RAMP}$ is below a predetermined voltage level. Transistor M4 has a first terminal connected to first voltage source $V_{DD}$ and a gate terminal connected to current source 122. Transistor M4 is substantially the same size as transistor M1, thereby causing substantially the same current $I_{AV1}$ to pass through the transistor M4. Transistor M13 has a first terminal and a gate terminal connected to a second terminal of transistor M4, and a second terminal connected to ground. Transistor M14 has a first terminal and a gate terminal connected to the second terminal of transistor M4, and a second terminal connected to ground. In accordance with an aspect of the invention, transistors M13 and M14 are selected to produce a desired clamp current $I_{CLAMP}$ that is greater than error amplifier current $I_{EA}$ (i.e., the current component generated by a current source 162 of error amplifier output stage 160 is less than clamp current $I_{CLAMP}$). NMOS switch transistor M15 has a first terminal connected to voltage source $V_{DD}$, a second terminal connected to the first terminal of the transistor M14, and a gate terminal connected to the first terminal of Miller capacitor C1 (i.e., connected to receive ramp voltage signal $V_{RAMP}$). Clamping transistor M16 has a gate terminal and first terminal connected to error amplifier output stage 160 (in particular, to the gate terminal of switch transistor 165A), and a second terminal connected to the first terminal of transistor M14.

During operation, while ramp voltage signal $V_{RAMP}$ is low (zero volts), switch transistor M15 remains turned off, causing all of clamp current $I_{CLAMP}$ to be drawn from error amplifier output stage 160 through clamping transistor M16, thereby pulling down amplifier control signal $V_{EA-CON}$ and minimizing regulated output voltage $V_{OUT}$. At power up (or reset), while ramp voltage signal $V_{RAMP}$ increases from zero volts toward the predetermined voltage level, switch transistor M15 gradually turns on to supply an increasing portion of clamp current $I_{CLAMP}$, which in turn gradually reduces the current portion drawn from error amplifier output stage 160 through clamping transistor M16. As the current portion drawn through clamping transistor M16 decreases in response to the ramp voltage signal, amplifier control signal $V_{EA-CON}$ gradually increases, which causes error amplifier output signal $V_{EA-OUT}$ to gradually increase from 0 V to maximum output swing, thus providing the desired soft-start characteristic. When ramp voltage signal $V_{RAMP}$ reaches the predetermined voltage level, switch transistor M15 is fully turned on such that clamp current $I_{CLAMP}$ is entirely drawn through switch transistor M15, and causes clamping transistor M16 to turn off, thus effectively isolating error amplifier output stage 160. While ramp voltage signal $V_{RAMP}$ remains at the predetermined voltage level, current error amplifier output stage 160 operates in a conventional manner to produce error amplifier output voltage $V_{EA-OUT}$ in response to error amplifier control signal $V_{EA-CON}$.

Although the present invention has been described with respect to certain specific embodiments, it will be clear to those skilled in the art that the inventive features of the present invention are applicable to other embodiments as well, all of which are intended to fall within the scope of the present invention.

The invention claimed is:

1. A switching regulator for supplying a regulated output voltage to a load circuit in response to an applied direct current (DC) input voltage, the switching regulator comprising;

an error amplifier circuit including a comparator for generating an amplifier control signal in response to a portion of the regulated output voltage and a predetermined reference voltage, and an output stage for generating an amplifier output signal in response to the control signal and the applied DC input voltage;

and an analog voltage ramp circuit including:

a current source for generating a first current;

a current divider for generating a second current in response to the first current, wherein the second current is lower than the first current;

an integrator circuit for generating a ramp voltage signal in response to the second current; and an analog voltage clamp circuit for clamping the amplifier control signal to the ramp voltage signal until the ramp voltage signal increases to a final voltage level.

2. The switching regulator according to claim 1, further comprising an output control circuit for controlling a power transistor in response to the amplifier output signal such that the regulated output signal is generated at a terminal of the power transistor.

3. The switching regulator according to claim 2, wherein the output control circuit comprises an oscillator circuit for generating a oscillating ramp signal, and a pulse width modulator for generating a pulse signal in response to the oscillating ramp signal and the amplifier output signal, wherein the pulse signal is applied to a gate terminal of the power transistor.

4. The switching regulator according to claim 1, wherein the current divider comprises:

a first current mirror for generating an intermediate current in response to the relatively high first current; and a second current mirror for generating the second current in response to the intermediate current, wherein the second current is substantially lower than the intermediate current, and the intermediate current is substantially lower than the first current.

5. The switching regulator according to claim 4, wherein the integrator circuit is connected to the current divider such that the second current passes between the integrator circuit and the second current mirror.

6. The switching regulator according to claim 5, wherein the integrator circuit comprises a Miller capacitor and means for causing the second current to gradually charge the Miller capacitor, whereby the gradually increasing charge on the Miller capacitor provides the ramp voltage signal.

7. The switching regulator according to claim 6, wherein the clamp circuit includes means for drawing a current through the output stage of the error amplifier circuit until the ramp voltage signal increases to the final voltage level.

8. The switching regulator according to claim 4, wherein the first current mirror comprises:

a first transistor connected in series with the current source between a first voltage source and a second voltage source, wherein a gate terminal of the first transistor is connected to the current source such that the first current passes through the first transistor;

a second transistor having a first terminal connected to the first voltage source and a gate terminal connected to the current source, wherein a size of the second transistor is selected such that the intermediate current is lower than the first current, wherein the second current mirror comprises:

a third transistor having a first terminal and a gate terminal connected to a second terminal of the second transistor, and a second terminal connected to the second voltage source, and a fourth transistor having a first terminal connected to the integrator circuit, a gate terminal connected to the second terminal of the second transistor, and a second terminal connected to the second voltage source.

9. The switching regulator according to claim 8, wherein the integrator circuit comprises:

a fifth transistor having a first terminal connected to the first voltage source and a gate terminal connected to the current source, wherein a size of the fifth transistor is substantially equal to a size of the first transistor such that the first current passes through the fifth transistor;

a capacitor having a first terminal connected to a second terminal of the fifth transistor, and a second transistor;

a sixth transistor having a first terminal connected to the second terminal of the capacitor, and a second terminal connected to the second voltage source;

a seventh transistor having a first terminal connected to the first terminal of the capacitor, a gate terminal connected to the first terminal of the sixth transistor, and a second terminal connected to the second voltage source; and an eighth transistor connected between the first terminal of the seventh transistor and a first terminal of the fourth transistor, wherein respective gate terminals of the sixth transistor and the eighth transistor are connected to receive a reset control signal.

10. The switching regulator according to claim 9, wherein the capacitor comprises a Miller capacitor.

11. The switching regulator according to claim 10, wherein the analog voltage clamp circuit comprises:

a ninth transistor having a first terminal connected to the first voltage source and a gate terminal connected to the current source, wherein a size of the ninth transistor is substantially equal to a size of the first transistor such that the first current passes through the ninth transistor;

a tenth transistor having a first terminal and a gate terminal connected to a second terminal of the ninth transistor, and a second terminal connected to the second voltage source;

an eleventh transistor having a first terminal, a gate terminal connected to the second terminal of the ninth transistor, and a second terminal connected to the second voltage source;

a twelfth transistor having a first terminal connected to the first voltage source, a second terminal connected to the first terminal of the eleventh transistor, and a gate terminal connected to the first terminal of the capacitor; and a thirteenth transistor having a gate terminal and first terminal connected to the output stage of the error amplifier, and a second terminal connected to the first terminal of the eleventh transistor.

12. The switching regulator according to claim 11, wherein the output stage of the error amplifier comprises:

an amplifier current source; and an output transistor having a gate terminal connected to the current source to the amplifier, and to the gate and first terminal of the thirteenth transistor, wherein an amplifier current generated by the amplifier current source is lower than the first current passing through the ninth transistor.

13. A switching regulator for supplying a regulated output voltage to a load circuit, the switching regulator comprising:

amplifier means for generating an amplifier control signal in response to the regulated output voltage and a predetermined reference voltage; and an analog soft-start circuit including:m an analog voltage ramp circuit for generating a ramp voltage signal; and an analog voltage clamp circuit for clamping the amplifier control signal to the ramp voltage signal until the ramp voltage signal increases to a predetermined voltage level, wherein the analog clamp circuit includes:

a current mirror for generating a predetermined clamp voltage;

a clamping element connected between the amplifier means and the current mirror such that at least a portion of the clamp voltage is drawn through the clamping circuit while the ramp voltage signal is less than the predetermined voltage level; and a switch connected between a voltage source and the current mirror, the switch being controlled by the ramp voltage signal such that substantially all of the clamp voltage is drawn through the switch when the ramp voltage signal is equal to the predetermined voltage level.

14. The switching regulator according to claim 13, wherein the current mirror comprises:

a ninth transistor having a first terminal connected to the voltage source and a gate terminal connected to a current source;

a tenth transistor having a first terminal and a gate terminal connected to a second terminal of the ninth transistor, and a second terminal connected to a second voltage source; and an eleventh transistor having a first terminal, a gate terminal connected to the second terminal of the ninth transistor, and a second terminal connected to the second voltage source, wherein the first terminal of the eleventh transistor is connected to the clamping element and the switch.

15. The switching regulator according to claim 14, wherein the clamping element comprises an NMOS transistor having a gate terminal and a first terminal connected to the amplifier means, and a second terminal connected to the first terminal of the eleventh transistor.

16. The switching regulator according to claim 15, wherein the switch comprises an NMOS transistor having a first terminal connected to the voltage source, a gate terminal connected to the analog voltage clamp circuit, and a second terminal connected to the first terminal of the eleventh transistor.

17. A switching regulator for supplying a regulated output voltage having a first current to a load circuit in response to an applied direct current (DC) input voltage, the switching regulator comprising:

means for generating an amplifier control signal in response to the regulated output voltage and a predetermined reference voltage, and for generating an amplifier output signal in response to the amplifier control signal and the applied DC input voltage;

means for generating a second current in response to the first current, wherein the second current is lower than the first current;

means for generating a ramp voltage signal in response to the second current; and means for clamping the amplifier control signal to the ramp voltage signal until the ramp voltage signal increases to a predetermined voltage level.

* * * * *

UNITED STATES PATENT AND TRADEMARK OFFICE

CERTIFICATE OF CORRECTION

PATENT NO. : 7,378,827 B2
APPLICATION NO. : 11/211199
DATED : May 27, 2008
INVENTOR(S) : Ioan Stoichita It is certified that error appears in the above-identified patent and that said Letters Patent is hereby corrected as shown below:

Title page, item (74) *Attorney, Agent or Firm*, should read -- Hoffman --.

Column 8, line 65, delete “relatively high”.

Column 10, line 39, amend “including:m” to -- including: --.

Signed and Sealed this

Twenty-ninth Day of July, 2008

JON W. DUDAS
*Director of the United States Patent and Trademark Office*